(12) United States Patent
Marshall et al.

(10) Patent No.: US 9,347,249 B2
(45) Date of Patent: May 24, 2016

(54) ARMORED VEHICLE DOOR RELEASE SYSTEM

(71) Applicants: Jon Marshall, Pinehurst, NC (US); Robert LeRoy Marshall, Fayetteville, NC (US)

(72) Inventors: Jon Marshall, Pinehurst, NC (US); Robert LeRoy Marshall, Fayetteville, NC (US)

( * ) Notice: Subject to any disclaimer, the term of this patent is extended or adjusted under 35 U.S.C. 154(b) by 6 days.

(21) Appl. No.: 14/491,524

(22) Filed: Sep. 19, 2014

(65) Prior Publication Data

US 2016/0017650 A1    Jan. 21, 2016

Related U.S. Application Data

(60) Provisional application No. 61/879,839, filed on Sep. 19, 2013.

(51) Int. Cl.
| | |
|---|---|
| *B60N 99/00* | (2006.01) |
| *E05D 7/12* | (2006.01) |
| *E05D 3/02* | (2006.01) |
| *B60J 5/04* | (2006.01) |

(52) U.S. Cl.
CPC ............... *E05D 7/121* (2013.01); *B60J 5/047* (2013.01); *E05D 3/02* (2013.01)

(58) Field of Classification Search
CPC ............ E05D 7/121; E05D 3/02; B60J 5/047
See application file for complete search history.

(56) References Cited

U.S. PATENT DOCUMENTS

| 1,896,203 | A | * | 2/1933 | Rosatelli | E05D 15/502 16/230 |
|---|---|---|---|---|---|
| 4,102,011 | A | * | 7/1978 | Clack, Jr. | B64C 1/1407 16/261 |
| 7,614,117 | B2 | * | 11/2009 | Selvaraj | E05D 7/121 16/258 |
| 7,938,479 | B2 | * | 5/2011 | Tuhy | E02F 3/3414 16/233 |
| 8,465,062 | B2 | * | 6/2013 | Weinerman | F41H 5/226 292/137 |
| 9,073,413 | B2 | * | 7/2015 | Maruyama | B60J 5/047 |

* cited by examiner

*Primary Examiner* — Lori L Lyjak
(74) *Attorney, Agent, or Firm* — Southeast IP Group, LLC; Thomas L. Moses

(57) ABSTRACT

A door release system for a tactical armored vehicle having a vehicle door frame with a receptacle and a vehicle door hinged to the frame is disclosed comprising a pair of releasable hinge bodies carried by the door. The hinge bodies include a head portion for abutting an area of the door frame surrounding the receptacle. A plug portion fits within the frame receptacle, and a lock portion follows the plug portion. An end portion follows the lock portion and is dimensioned smaller than the frame receptacle. A hinge release assembly includes a latch means for locking the hinge bodies in place in the receptacles to prevent removal of the hinge bodies in a locked position. An actuator disengages said means to release said hinge bodies for removal from said door frame and vehicle in a hazardous situation.

27 Claims, 6 Drawing Sheets

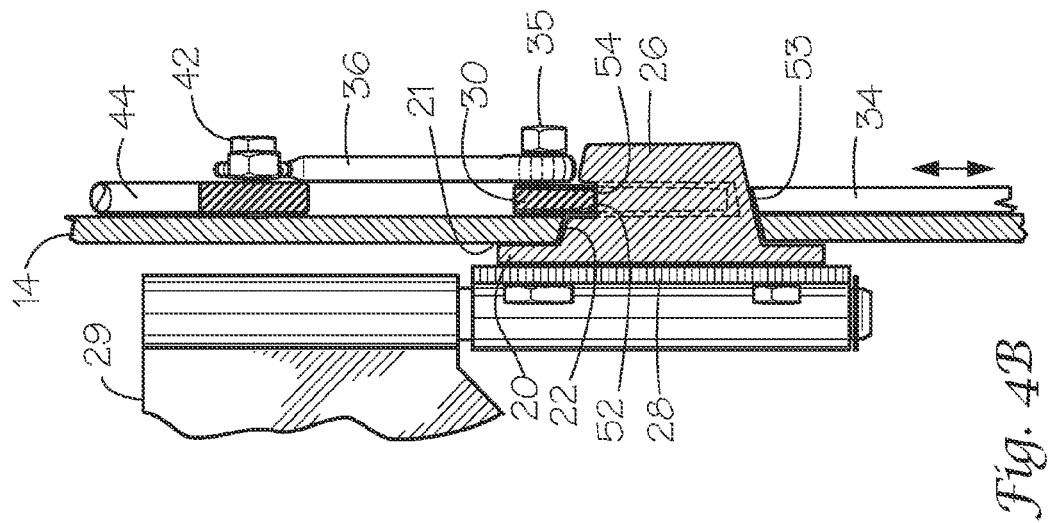
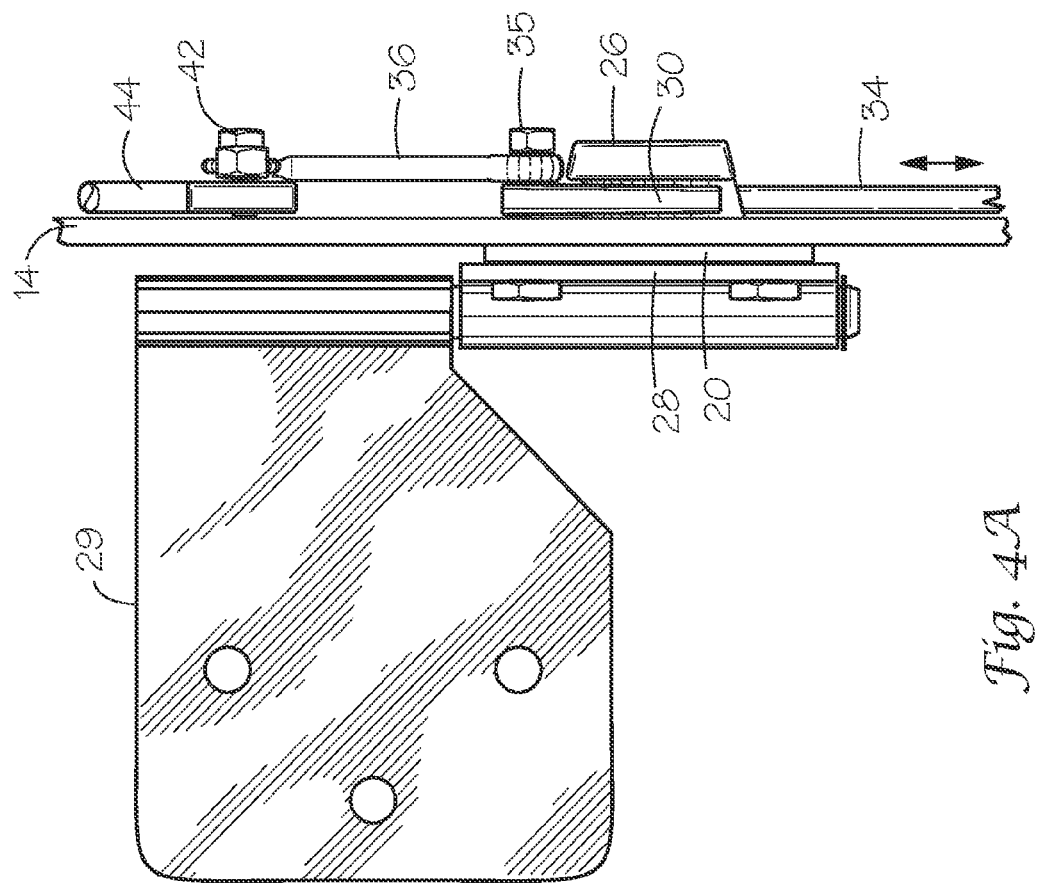

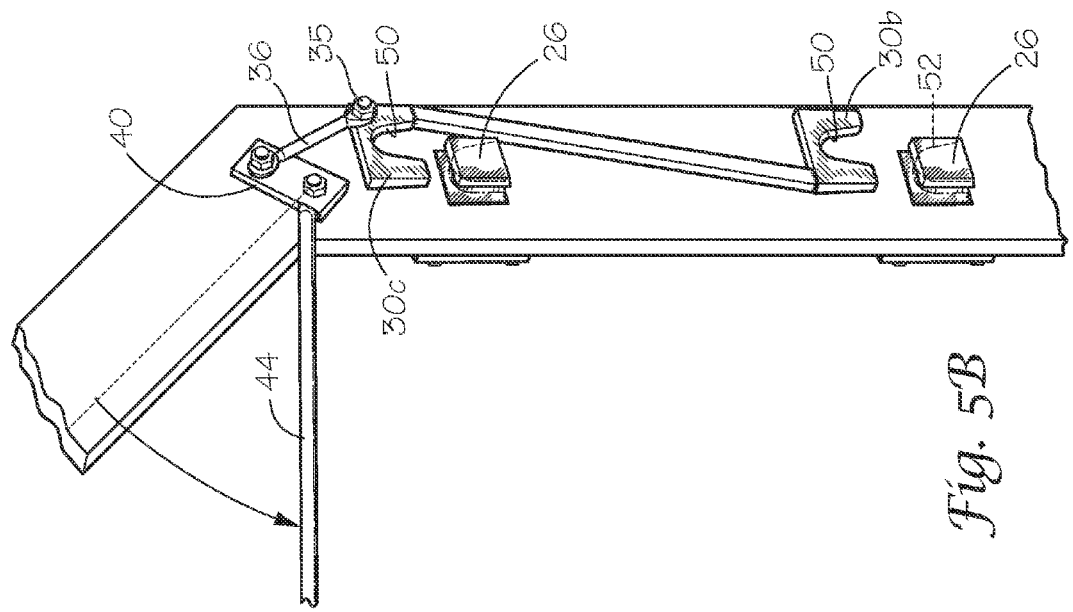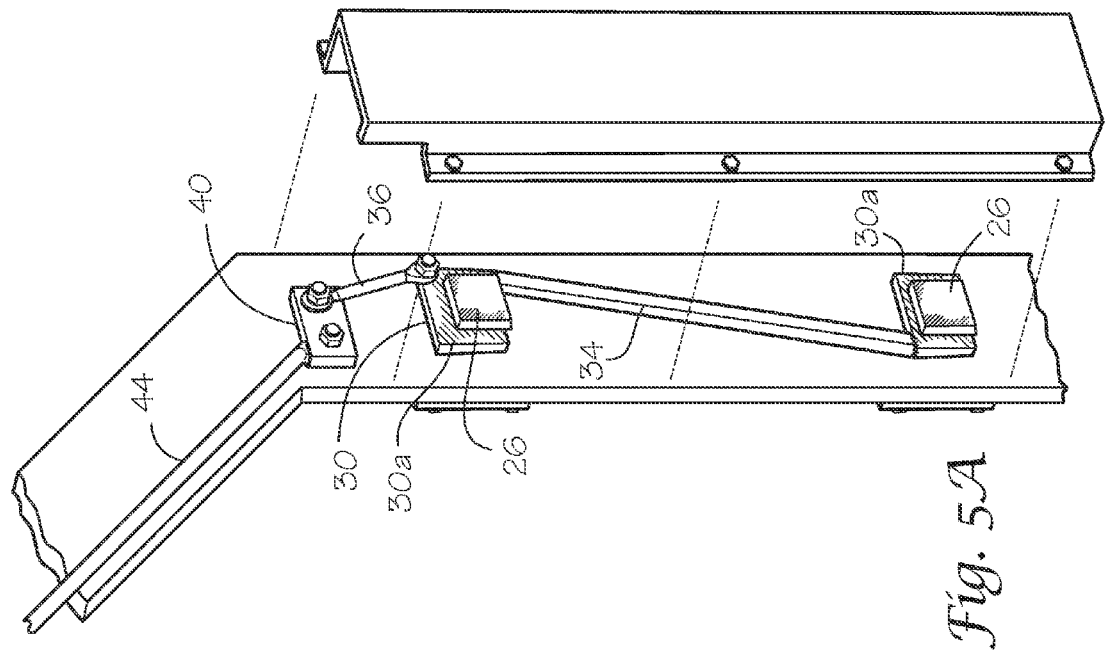

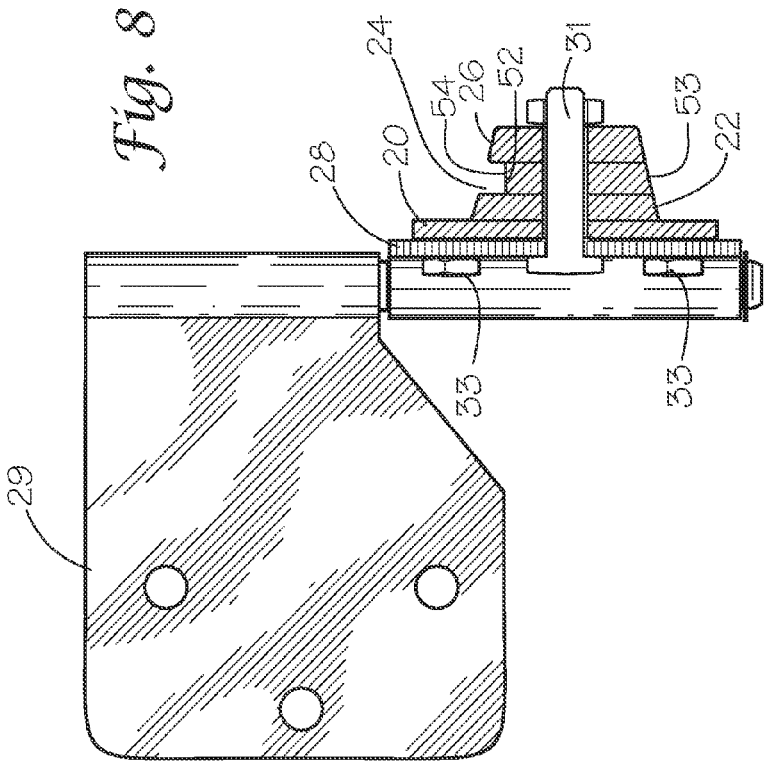
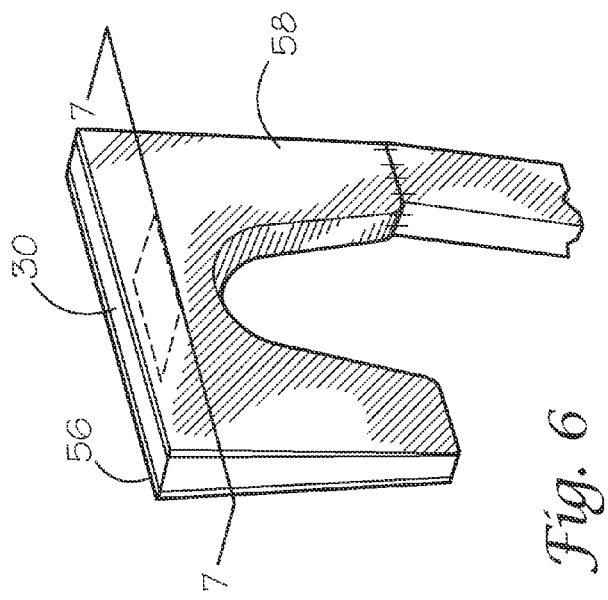
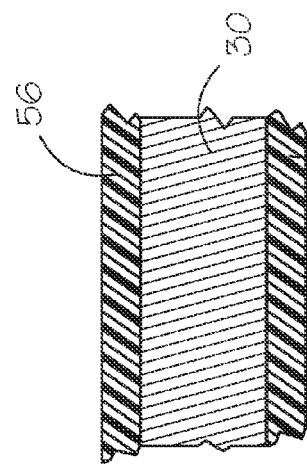

ARMORED VEHICLE DOOR RELEASE SYSTEM

BACKGROUND OF THE INVENTION

The invention relates to a releasable hinge assembly for an armored military vehicle and the like which allows the door of the vehicle to be released and completely removed under emergency conditions.

Although the focus of this application is primarily on heavy duty latching systems and components that are particularly well suited for use with the heavy doors of armored military vehicles (including latches, latch operating handles and other components capable of being used in "normal" and "emergency" modes to provide access, entry, egress and rescue), much of what is disclosed herein also can be used to augment, improve and enhance the capability, durability and performance of lighter duty hardware systems and components used in a wide variety of other applications. Likewise, although the present application discloses an arrangement of linkages, connections, and actuators that can retract and allow the door to be jettisoned in response to emergency and hazardous situations, differently configured operating handles, many of the improvements, enhancements and advancements described herein also can be used to upgrade the capabilities and to lengthen the service lives of other closure-control systems and lighter-duty hardware components.

With the advent of improvised explosive devices (IED) and other weapons of destruction, used against coalition military forces in Iraq, Afghanistan, and other areas of conflict, the need to upgrade tactical military vehicles and other armored vehicles has been continuing. Military armored vehicles have been provided with heavier armor and new designs which have lessened the effect of an IED explosion to the vehicle, and protect the occupants. However, even with the new designs and construction, the vehicle and doors can be damaged to the extent that the occupants cannot open the door. In this case, the vehicle can be set on fire and the occupants cannot escape, or an explosive device may explode while the vehicle is on a bridge, throwing the vehicle into the water. The door of the vehicle typically cannot be opened underwater due to its large weight e.g., 400 pounds leaving the occupants unable to escape. Therefore the need of providing an armored vehicle door which can be rapidly and reliably jettisoned from the vehicle still exists.

Doors for armored vehicles, industrial vehicle cabs, and aircraft, as well as other vehicles, must be jettisoned from their frames rapidly and easily to provide maximum opening for the quick exiting of occupants in emergencies. Typically armored vehicle doors weigh up to four hundred pounds making them difficult to open in certain hazardous situations. It has been found if the door can be released from the pivotal hinge and the door frame, the occupants have a better chance of escaping. Prior vehicle and aircraft hinges which may be released have been provided, for example U.S. Pat. Nos. 7,614,117 B2, 7,938,479 B2, 8,465,062 B2, 4,102,011, 1,896,203, and published application US2012/0000047, all disclose various arrangements for releasing the hinge of doors in various applications. U.S. Pat. Nos. 5,074,611, 7,992,924, and 4,235,047 disclose aspects of armored vehicles and doors. However, doors for aircraft utilize assemblies that are complicated and foreign to armored vehicle doors. Thus, an object of the present invention is to provide a releasable door hinge for an armored vehicle so that the door may be reliably jettisoned for escape in hazardous and emergency situations.

SUMMARY OF THE INVENTION

To reasonably limit the length of this summary, mention is made here of only a selected few of the features that are offered by and derive from the number of invention embodiments disclosed in this provisional application. Because mention is made here of only a few of the many features disclosed in this application, this summary is not to be interpreted as limiting the subject matter that is expected to be addressed by, nor the scope of the claims expected to be included in this application. The above objective is accomplished according to the present invention by providing a door release system for a tactical armored vehicle of the type having a vehicle door frame, a vehicle door carried by the door frame, and a frame receptacle formed in the door frame. A first releasable hinge body is carried by the door, and a second releasable hinge body is carried by the door spaced from the first releasable hinge body. Each of the first and second releasable hinge bodies includes a head portion dimensioned greater than a dimension of the frame receptacle for abutting a surrounding area of the door frame, a plug portion fitting within the frame receptacle, a lock portion following the plug portion, and an end portion following the lock portion dimensioned greater than the lock portion and less than the frame receptacle. Advantageously, a hinge release assembly is provided for releasing the hinge bodies and the door, including a first releasable latch member adapted to engage the lock portion of the first releasable hinge body, and a second releasable latch member adapted to engage the lock portion of the second releasable hinge body. An actuator is provided for disengaging the latch members to move the latch members from the locked position to an unlocked position. Preferably, the frame receptacle is a tapered frame receptacle tapered inwardly through the vehicle frame. Each plug portion is tapered inwardly from the head portion in the same manner as each tapered receptacle to facilitate outward reliable release of each hinge body from the frame. The releasable latch assembly includes a latch bar connector between the actuator and each latch member. The releasable latch assembly includes a pivot mechanism connecting the latch bar and the actuator so that actuation of the actuator simultaneously releases each latch member from each lock portion whereby each first and second hinge body is released and removed with the door. Each lock portion includes a latch element extending between the plug portion and end portions to define a slot there between. Preferably, each latch member includes a shaped notch that engages the latch element in the slot. Advantageously, a first shim and a second shim are disposed on opposing sides of each latch member in the slot, the shims being of a low friction surface to provide reliable removal of the latch member from the slot.

DESCRIPTION OF THE DRAWINGS

The invention will be more readily understood from a reading of the following specification and by reference to the accompanying drawings forming a part thereof, wherein an example of the invention is shown and wherein:

FIG. 4A is a side view of a releasable hinge assembly for armored vehicle according to the invention;

FIG. 4B is a sectional view of the releasable hinge assembly of FIG. 4A;

FIG. 5A is a rear perspective view of a releasable vehicle hinge assembly with the hinge assembly locked into a locked position and outside cover removed; and FIG. 5B is a rear perspective view of the releasable vehicle assembly and unlocked position.

FIG. 6 is a perspective view of a latching member and shim assembly of the present invention;

FIG. 7 is a top view of the latch member and shim plates according to the invention;

FIGS. 8 through 10B illustrate an alternate embodiment of a releasable hinge body according to the invention;

FIG. 10A is a top view and FIG. 10B is a section of 10A.

DESCRIPTION OF A PREFERRED EMBODIMENT

Figure 1:
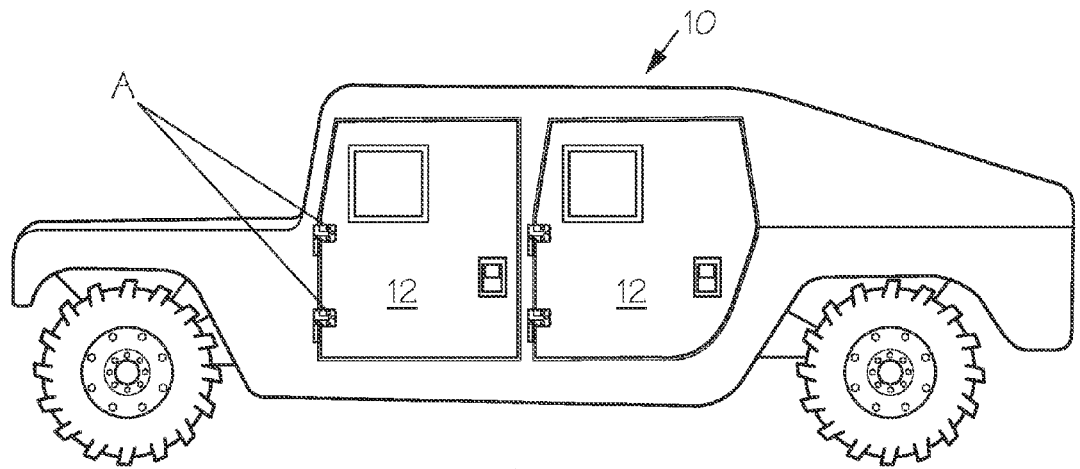
FIG. 1 is a side elevation of a generic armored vehicle to which the invention is applied.

Referring now to the drawings, the invention will now be described in more detail. An armored vehicle door release system, designated generally as A, is disclosed having a releasable hinge body assembly, illustrated generally as B, and a releasable latch assembly, designated generally as C.

Figure 2:
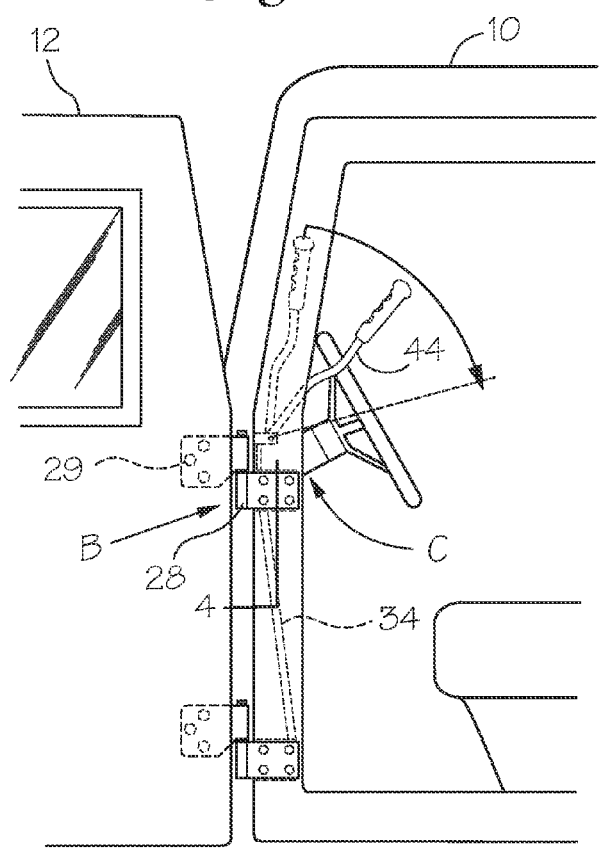
FIG. 2 is a side elevation of a releasable hinge assembly mounted to a frame or pillar of the vehicle according to the invention.
Figure 3:
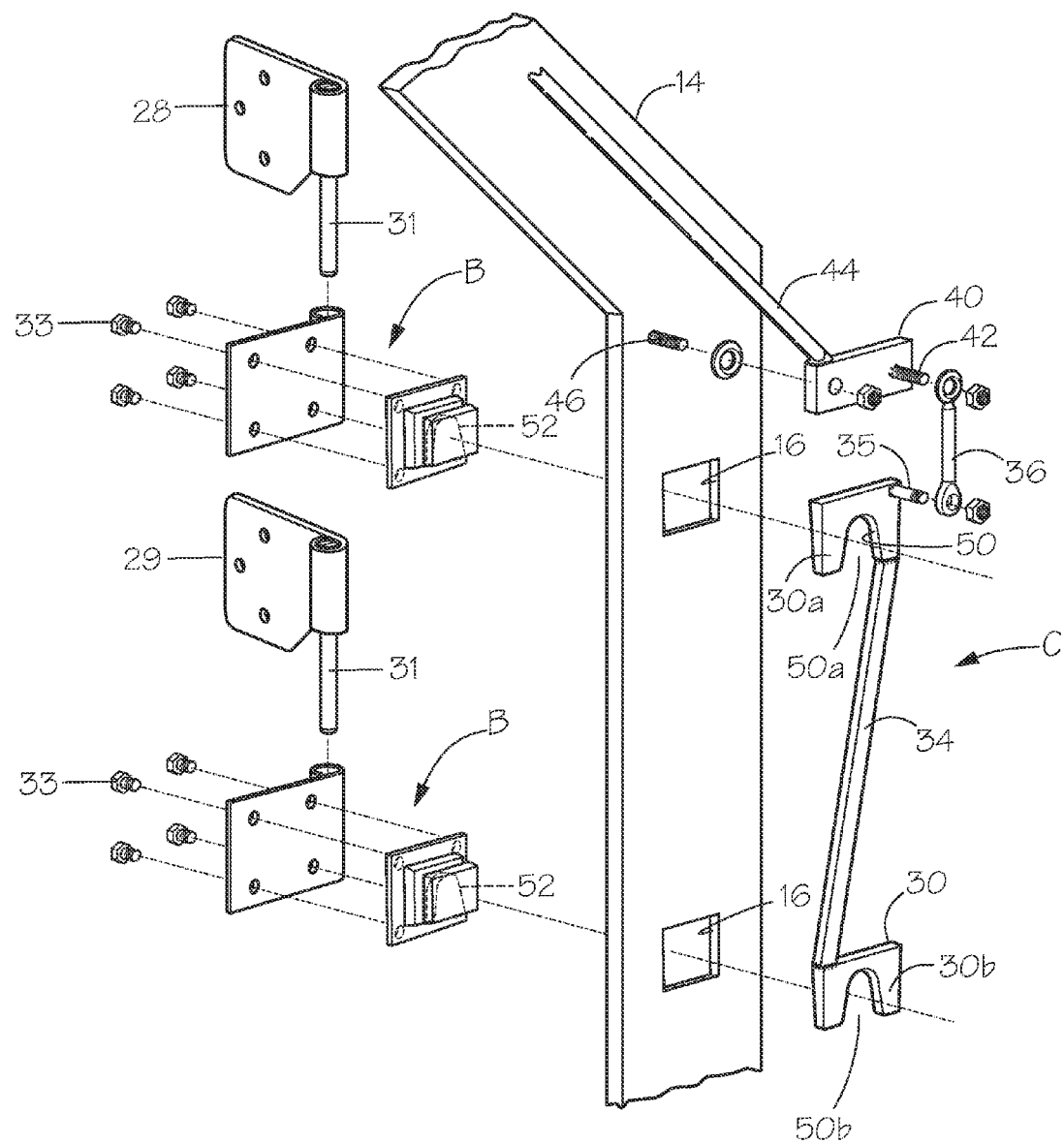
FIG. 3 is a rear perspective view with parts exploded illustrating a releasable hinge assembly for an armored vehicle according to the invention.
Figure 9:
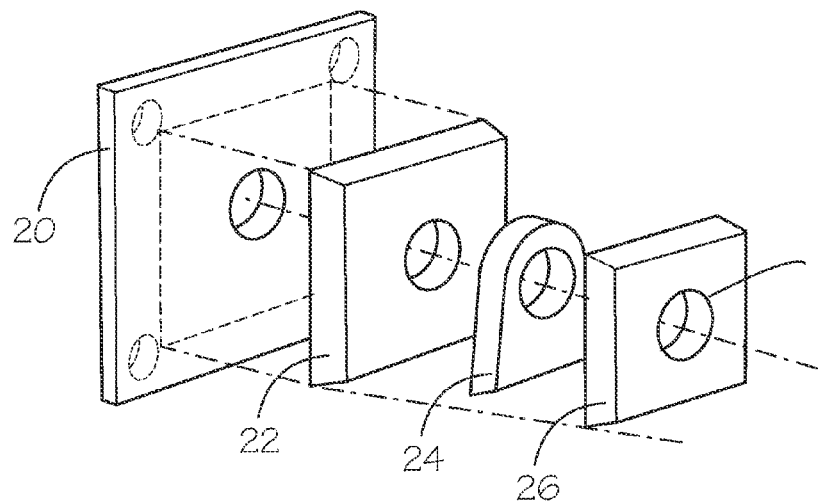
Figure 10A:
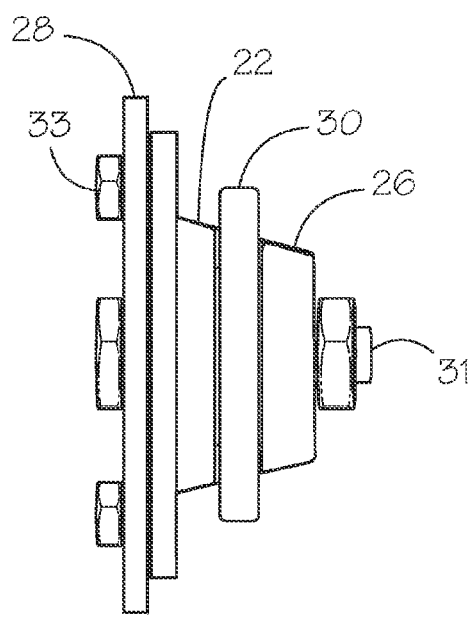
Figure 10B:
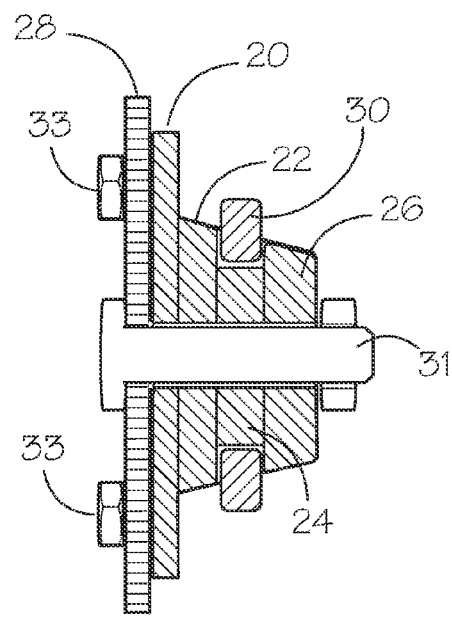

As can best be seen in FIGS. 1-3, vehicle door release system A is illustrated together with an armored vehicle 10 having doors 12 supported by a door frame structure 14. A receptacle 16 is formed in the door frame structure or pillar 18. Releasable hinge body assembly B is received in receptacle 16 and incorporated into the door frame structure. Releasable hinge body assembly B, also referred to herein as a releasable hinge body or bodies, includes a head portion 20, whose dimension is greater than any dimension of tapered receptacle 16, which abuts door frame structure in an area 21 surrounding the receptacle to prevent further movement of the hinge body inward. The hinge body further includes a plug portion 22 which fits within receptacle 16 when head portion 20 is engaged against the outer door frame structure. A lock portion 24 follows the plug and an end portion 26 of the hinge body terminates releasable hinge body B. End portion 26 is dimensioned to be smaller than any dimension of the receptacle 16 so that it is easily and reliably removed. Preferably, hinge body assembly B is heavy metal portions machined as one piece, or made integral by fastening the head portion, the lock portion, and the end portion together by suitable means such as a common fastener securing the portions together such as a bolt 31 extending through the portions.

In a preferred embodiment of the invention, plug portion 22 and end portion 26 are tapered from the head portion 20 to the end portion to provide a tapered plug portion and a tapered end portion (FIGS. 4B and 8-10B). The receptacle 16 is also tapered in the same direction to provide a tapered receptacle. By this means, the tapered plug portion is fitted tightly in the tapered receptacle during normal conditions. However, the taper allows the plug to release reliably in an outward direction. The smaller tapered end portion 26 moves easily through the tapered receptacle as well. The taper is exaggerated in the drawings for the purpose of illustration and may be as slight as 0.005 per inch. Other shapes, dimensions, or non-tapered hinge body portion, and corresponding receptacle may be utilized as long as reliable release of the hinge body is assured. Preferably, a first hinge part 28 is bolted or welded to head portion 20 of the releasable hinge body assembly B which mates using a pin 31 with a second hinge part 29 affixed to the door so that the hinge body assembly is removed with the door.

While the vehicle door release system A has been described above in connection with a single releasable hinge body assembly B, it will be understood, of course, that each door 12 of the vehicle will be provided a releasable hinge body B at two or more locations on the door and pillar frame structure. However, only a single hinge latch assembly C is needed for locking and unlocking both releasable hinge bodies as shown below.

Releasable latch assembly C locks the tapered plug portion of hinge bodies B fitted into the tapered receptacle in place at the top and bottom hinge of the door (FIGS. 3 and 5A, 5B). The releasable latch assembly includes a pair of latch members 30, each engaging lock portion 24 of each hinge body. The latch members are connected to a latch bar 34. A first latch member 30a is pivotally connected to the top of latch bar 34 at pivot bolt 35, and a second latch member 30b is affixed to the bottom of the latch bar. A rotary linkage 36 connects the top latch member 30 to a pivoting mechanism 40. Rotary linkage 36 is connected to the pivoting mechanism by means of a nut and bolt 42. Extending from the pivoting mechanism is an actuator arm 44 for lifting the latch bar upwards when the actuator arm is pivoted downwardly about a pivot bolt 46. This action raises the latch bar and causes the latch members 30a and 30b to disengage from the lock portion of the releasable hinge bodies B. In this manner, hinge bodies B may be easily released from receptacles 16 and the door frame so that the door separates. The latch bar 34 preferably has a range of about 90 degrees between the lock position (FIG. 5A) and unlocked position (FIG. 5B) of the latch members. The latch members begin to unlock at about 30 degrees of rotation of the arm which requires a lifting force of about 60 lbs.

Preferably, releasable latch assembly C includes a shaped notch 50 formed in each latch member 30 which tapers inwardly from a notch opening 50a to the closed end of the notch. In this case, lock portion 24 of the hinge body may be advantageously made to include a latch element 52 shaped like notch 50 (FIGS. 3, 9) or shaped like a round latch, like a bolt, rod, or pin so that notch 50 may slide over and lock with the locking portion of the plug body. Lock portion 24 is more particularly defined by a slot 54 created between tapered plug portion 22 and tapered end portion 26 in which the latch member is received over the latch element. The latch element 52 extends between the sides of the slot, and the slot needs only to be formed on the top and sides of the latch element. The bottom of the lock portion may be smooth and continuous with the bottom of the tapered plug and end portions, as seen at 53 in FIGS. 4B and 8. Of course, the lock portion may be made in other shapes and the notch may be made in complementary shapes such as a bar having a square, rectangle, or other geometrically shaped cross-section. To prevent sticking of the latch member 30 in slot 54, first and second shims 56 and 58 (FIG. 7) fit in the slot on the sides of latch member 30 which may be, itself, a heavy metal plate. The shims are preferably made from a low friction material such as Teflon and the like. This eliminates the problem of the lock member becoming stuck or rusted in the slot due to the adverse conditions of sand, moisture, saltwater and the like. In this manner, the shims act like a lubricant so that the latch member does not stick in the slot and releases reliably from the slot.

The invention has been described in such detail as to enable one of ordinary skill in the art to make and use the invention and in such simplicity as to enable others to understand as well. The detailed dimensions, thicknesses, taper, material types, heaviness of the parts, fasteners and bolts, and other constructions of the plates, linkages, and other parts and aspects of the invention will be well within the purview of one of ordinary skill in the art.

While the preferred embodiment of the invention has been described using specific terms, such description is for illustrative purposed only, and it is to be understood that changes and variations may be made without departing from the spirit or scope of the following claims.

What is claimed is:

1. A door release system for an armored vehicle and the like comprising:
   a door frame;
   a frame receptacle formed in said door frame;
   at least one releasable hinge body assembly having a releasable hinge body which includes;
      an enlarged head portion with a dimension greater than a dimension of said frame receptacle for abutting a surrounding area of the door frame;
      a plug portion fitting within said frame receptacle;
      a lock portion following said plug portion, and
      an end portion following said lock portion having a dimension greater than said lock portion and less than said frame receptacle;
   a releasable latch assembly having a latch member adapted to engage said lock portion of said hinge body to prevent movement and removal of said releasable hinge body in a locked position; and
   an actuator for disengaging said latch member from said locked position and moving said latch member to an unlocked position so that said door can be removed from the vehicle.

2. The system of claim 1 wherein said releasable latch assembly includes a moveable latch bar connected to said latch member and said latch bar being moved by said actuator between said locked and unlocked positions.

3. The system of claim 2 including a first shim and a second shim disposed on opposing sides of each said latch member in said slot, said shims being of a low friction surface to provide reliable removal of said latch member from said slot.

4. The apparatus of claim 2 including a pivot mechanism pivotally connecting said actuator and said latch bar.

5. The system of claim 4 including a rotary joint connecting said latch bar to said actuator so that actuation of said actuator removes said latch member from said locked position whereby said hinge body is released and said door can be removed from said door frame and vehicle.

6. The system of claim 5 wherein said latch member includes a shaped notch that engages said lock portion.

7. The system of claim 1 wherein said lock portion includes a shaped latch element engaged directly by said latch member notch, and said latch member includes a latching notch having a complimentary shape to said latch element.

8. The system of claim 1 wherein said frame receptacle includes a tapered receptacle tapered inwardly through the door frame.

9. The system of claim 8 wherein said plug portion is a tapered plug portion tapered inwardly from said head portion.

10. The system of claim 9 wherein the tapered plug portion is tapered inwardly in the same manner as the tapered receptacle to form a tight fit and yet facilitate reliable removal of the hinge body from the door frame upon release of said latch member.

11. The system of claim 1 wherein said hinge body including said head portion, said plug portion, said lock portion, and said end portion are integral.

12. The system of claim 11 wherein said head, plus and end portions are made integral by a common fastener extending through said portions fastening the same together.

13. The system of claim 1 wherein said head portion, plug portion, lock portion, and end portion of said hinge body are formed as one piece.

14. The system of claim 1 including a first hinge part carried by said releasable hinge body and a second hinge part attachable to said door so that actuation of said latch bar and disengagement of said latch member causes said hinge plug to be released and removed with the door.

15. A door release system for a tactical armored vehicle comprising:
   a vehicle door frame;
   a vehicle door carried by said door frame;
   a frame receptacle formed in said door frame;
   a first releasable hinge body carried by said door, and a second releasable hinge body carried by the door spaced from said first releasable hinge body;
   each said first and second releasable hinge body including;
      a head portion with a dimension greater than a dimension of said frame receptacle for abutting a surrounding area of the door frame,
      a plug portion fitting within said frame receptacle,
      a lock portion following said plug portion, and
      an end portion following said lock portion having a dimension greater than said lock portion and less than said frame receptacle;
   a hinge release assembly including a first releasable latch member adapted to engage said lock portion of said first releasable hinge body, and a second releasable latch member adapted to engage said lock portion of said second releasable hinge body to prevent movement and removal of said releasable hinge bodies in a locked position; and an actuator for disengaging said latch members to move said latch members from said locked position to an unlocked position.

16. The system of claim 15 wherein said frame receptacle is a tapered frame receptacle tapered inwardly through the vehicle frame.

17. The system of claim 16 wherein each said plug portion is a tapered plug portion tapered inwardly from said head portion in the same manner as each tapered receptacle to facilitate reliable release of each hinge body from the frame.

18. The system of claim 15 wherein said head portion, plug portion, lock portion, and end portion of each said hinge body is formed as one piece.

19. The system of claim 15 wherein said head portion, said plug portion, said lock portion, and said end portion are made integral by a common fastener fastening said body portions together.

20. The system of claim 15 wherein said releasable latch assembly includes a latch bar connector between said actuator and said latch member.

21. The system of claim 20, wherein said releasable latch assembly includes a pivot mechanism connecting said latch bar and said actuator so that actuation of said actuator simultaneously releases each said latch member from each said lock portion whereby each said first and second hinge body is released and removed with said door.

22. The system of claim 15 wherein said latch assembly includes a moveable latch bar connected to each said latch member and moved by said actuator between said locked and unlocked positions.

23. The system of claim 15 wherein each said lock portion includes a latch element extending between said plug portion and end portions to define a slot there between.

24. The system of claim 23 wherein each said latch member includes a shaped notch that engages said latch element in said slot.

25. The system of claim 23 wherein each said latch member is positioned in said slot in said locked position.

26. The system of claim 25 including a first shim and a second shim disposed on opposing sides of each said latch member in said slot, said shims being of a low friction surface to provide reliable removal of said latch member from said slot.

27. A door release system for a tactical armored vehicle having a vehicle door frame with a receptacle and a vehicle door hinged to the frame comprising:
- a pair of releasable hinge bodies carried by the door;
- said hinge bodies including a head portion for abutting an area of the door frame surrounding said receptacle, a plug portion for fitting within said frame receptacle, a lock portion following said plug portion, and an end portion following said lock portion being dimensionally smaller than said frame receptacle;
- a hinge release assembly including a latch means for locking hinge bodies in place in said receptacles to prevent removal of said hinge bodies in a locked position; and an actuator for disengaging said means to release said hinge bodies for removal from said door frame and vehicle in a hazardous situation.

* * * * *